United States Patent [19]

Inaba et al.

[11] Patent Number: 5,691,017
[45] Date of Patent: Nov. 25, 1997

[54] AIRBAG STORING CASING

[75] Inventors: Kazuo Inaba, Fuji; Tatsuo Hamanaka, Ichihara; Mitsuyo Maeda, Sagamihara, all of Japan

[73] Assignees: Nihon Plast Co., Ltd., Fuji; Sumitomo Chemical Co., Ltd.; Tanabe Chemical Industrial Inc., both of Osaka, all of Japan

[21] Appl. No.: 655,217

[22] Filed: Jun. 5, 1996

Related U.S. Application Data

[62] Division of Ser. No. 159,269, Nov. 30, 1993, abandoned.

[30] Foreign Application Priority Data

Nov. 30, 1992 [JP] Japan .................... 4-320027

[51] Int. Cl.$^6$ .............. C08L 23/12; C08L 23/14
[52] U.S. Cl. ............ 428/35.7; 428/34.1; 428/424.2; 428/516; 525/240
[58] Field of Search ................ 428/34.1, 35.7, 428/516, 424.2; 525/240

[56] References Cited

U.S. PATENT DOCUMENTS

| | | | |
|---|---|---|---|
| 4,735,988 | 4/1988 | Takada et al. | 524/504 |
| 5,187,224 | 2/1993 | Hamanaka et al. | 524/504 |
| 5,308,699 | 5/1994 | Hikasa et al. | 428/402 |
| 5,611,565 | 3/1997 | Inaba et al. | 280/728.3 |

FOREIGN PATENT DOCUMENTS

| | | |
|---|---|---|
| 0 429 236 | 5/1991 | European Pat. Off. . |
| 63-232052 | 9/1988 | Japan . |
| 2-171364 | 7/1990 | Japan . |
| 2 254 618 | 10/1992 | United Kingdom . |

OTHER PUBLICATIONS

Patent Abstract, Database WPI, Derwent Publications Ltd., (Abstract of JP-A-61 108 638 (AN 86-174325), published May 27, 1986).

*Primary Examiner*—W. Robinson H. Clark
*Attorney, Agent, or Firm*—Foley & Lardner

[57] ABSTRACT

A casing for storing an airbag of an airbag restraint system for an automobile vehicle. The casing is formed of a material comprising (a) a thermoplastic elastomer composition in an amount of 100 parts by weight, the thermoplastic elastomer composition being prepared by a process including mixing 10 to 50 parts by weight of a polyolefine resin with 100 parts by weight of an olefine copolymer rubber to obtain a mixture, dynamically heat-treating the mixture in the presence of an organic peroxide, and then adding 5 to 50 parts by weight of a mineral oil relative to 100 parts by weight of the dynamically heat-treated mixture, the olefine copolymer rubber having a Mooney viscosity ($ML_{1+4}$, 100° C.) ranging from 50 to 100; (b) a random copolymer resin in an amount of 20 to 50 parts by weight, containing propylene and at least one kind of 1-olefine other than propylene and having a Melt Flow Rate (230° C.) ranging from 30 to 100; and (c) a modified polypropylene oligomer containing hydroxyl group, in an amount ranging from 1 to 5 parts by weight.

20 Claims, 2 Drawing Sheets

AIRBAG STORING CASING

This application is a division of application Ser. No. 08/159,269, filed Nov. 30, 1993, now abandoned.

BACKGROUND OF THE INVENTION

1. Field of the Invention

This invention relates to improvements in a casing for storing an airbag of an airbag restraint system which casing is adapted to be developed under the influence of high pressure gas from an inflator which is operated in response to impact at a vehicle collision or the like.

2. Description of the Prior Art

Hitherto, a variety of casings for storing an airbag have been known, in which polyurethane foam is used as its material in order to provide a softness feeling to the skin layer part of the casing which part constitutes an interior part of a vehicle. In these casings, a hard resin material or a net-like fibrous reinforcing material is used as a core layer in the casing in order that the casing tears only along a predetermined tearing line (a thin wall part) when the airbag operates and in order to prevent fine broken pieces from scattering at that time, as disclosed, for example, in Japanese Patent Laid-Open No. 63-23052.

However, drawbacks have been encountered in these casings, in which the casings are of a multi-layer structure and therefore is complicated in its fabrication process thereby lowering a yield or productivity and having a tendency that an unevenness is formed at the surface owing to an insert and a core layer used.

Additionally, the casing in which the fibrous reinforcing material is inserted therein has a problem that the fibrous reinforcing material tends to shift in location during fabrication because of a low rigidity of the fibrous reinforcing material. From viewpoints of solving this problem and lowering a production cost, it has been proposed to produce the airbag storing casing of a thermoplastic elastomer by an injection molding without using the above-mentioned insert, as disclosed, for example, in Japanese Patent Laid-Open No. 2-171364.

However, the thus produced casing has a thin wall section at its tearing portion of a lid member. Besides, the casing is in a structure in which the wall thickness continuously increases from the thin wall section of the tearing portion, so that the area of a thin wall is large. As a result, this thin wall section tends to be affected by heat and light inside the vehicle, and therefore the external appearance of the casing is deteriorated.

In view of these problems, it will be supposed to form a decorative protecting layer or coating film at the surface of the casing. However, in case of using a polyolefin material as the material of the casing for storing an airbag, a so-called two-coat and two-bake manner or a so-called two-coat and one-bake manner are necessary to rigidly bond the coating film to the surface of the casing, thus increasing a production cost. In the two-coat and two-bake manner, a primer is first coated and dried, and thereafter a paint is coated and dried. In the two-coat and one-bake manner, a primer is coated, and then a paint is coated and dried.

SUMMARY OF THE INVENTION

It is an object of the present invention to provide an improved airbag storing casing which can overcome drawbacks encountered in conventional airbag storing casings.

Another object of the present invention is to provide an improved airbag storing casing which can suitably functions so as to securely store an airbag therein and to effectively tear along predetermined lines when the airbag is inflated to protect a vehicle occupant.

A further object of the present invention is to provide an improved airbag storing casing which is of a single layer structure, and excellent in external appearance and low in production cost.

A still further object of the present invention is to provide an improved airbag storing casing which is coated with a surface layer high in rigidity and in adherence characteristics, under a one-coat and one-bake manner.

The first aspect of the present invention resides in an airbag storing casing formed of a material comprising: (a) a thermoplastic elastomer composition in an amount of 100 parts by weight, the thermoplastic elastomer composition being prepared by a process including mixing 10 to 50 parts by weight of a polyolefin resin with 100 parts by weight of an olefin copolymer rubber to obtain a mixture, dynamically heat-treating the mixture in the presence of an organic peroxide, and then adding 5 to 50 parts by weight of a mineral oil relative to 100 parts by weight of the dynamically heat-treated mixture, the olefin copolymer rubber having a Mooney viscosity ($ML_{1+4}$, 100° C.) ranging from 50 to 100; (b) a random copolymer resin in an amount of 20 to 50 parts by weight, containing propylene and at least one kind of 1-olefine other than propylene and having a Melt Flow Rate (230° C.) ranging from 30 to 100; and (c) a modified polypropylene oligomer containing hydroxyl group, in an amount ranging from 1 to 5 parts by weight.

The second aspect of the present invention resides in a combination of the above-mentioned airbag storing casing and a paint coated on the surface of the airbag storing casing, in which the paint contains a resin component including chlorinated polyolefin resin, and polycaprolactone polyol resin; a modifier including alcohol-modified silicone; and a hardener including a mixture of an addition product of hexamethylene diisocyanate, isophorone diisocyanate and polyol and an addition product of hexamethylene diisocyanate and polyester polyol.

As a result of eager studies conducted on materials of the airbag storing casing of the single layer structure and paints to be coated on the airbag storing casing under a one-coat and one-bake manner, the inventors have found an effective composition as the material of the airbag casing and a specified paint compatible to the composition, thus establishing the principle of the present invention.

According to the present invention, by forming the airbag storing casing of the above specified material, the airbag storing casing effectively functions so as to tear only along predetermined tearing lines when the airbag operates thereby allowing the airbag to smoothly inflate in a predetermined direction, though the airbag is of the single layer structure. Additionally, a paint coated film high in adherence characteristics at a wide temperature range from low to high temperatures can be formed by virtue of the compatible combination of the airbag storing casing material and the specified paint. Accordingly, it is made possible to facilitate a painting operation and to provide the airbag storing casing which is excellent in safety and external appearance.

DETAILED DESCRIPTION OF THE INVENTION

Figure 1:
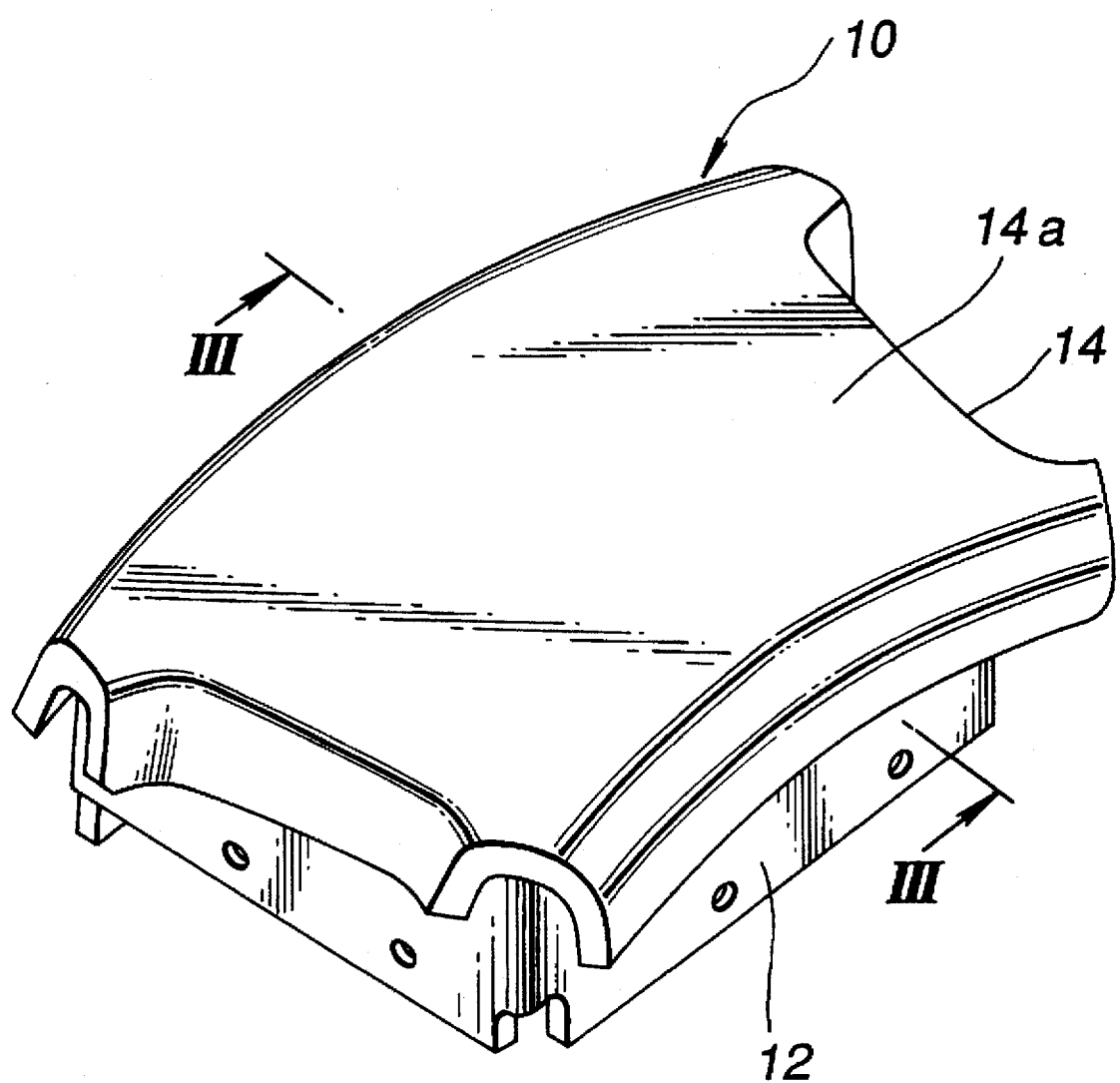
FIG. 1 is a perspective view of an embodiment of an airbag storing casing in accordance with the present invention, as viewed from an above direction.

According to the present invention, a casing for storing an airbag is formed of a material comprising:

(a) a thermoplastic elastomer composition in an amount of 100 parts by weight, said thermoplastic elastomer composition being prepared by a process including mixing 10 to 50 parts by weight of a polyolefin resin with 100 parts by weight of an olefin copolymer rubber to obtain a mixture, dynamically heat-treating said mixture in the presence of an organic peroxide, and then adding 5 to 50 parts by weight of a mineral oil relative to 100 parts by weight of the dynamically heat-treated mixture, said olefine copolymer rubber having a Mooney viscosity ($ML_{1+4}$, 100° C.) ranging from 50 to 100;

(b) a random copolymer resin in an amount of 20 to 50 parts by weight, containing propylene and at least one kind of 1-olefine other than propylene and having a Melt Flow Rate (230° C.) ranging from 30 to 100; and (c) a modified polypropylene oligomer containing hydroxyl group, in an amount ranging from 1 to 5 parts by weight.

In the airbag storing casing of the present invention, the material itself constituting the casing is essential and therefore the structure and the like other than the material are particularly not limited. The airbag storing casing of the present invention constitutes part of an airbag restraint system which is arranged to inflate the airbag automatically at any time a front-end collision occurs in order to protect a vehicle occupant from coming into direct contact with, for example, a steering wheel and/or a windshield.

The material used for the airbag storing casing of the present invention will be discussed. The olefine copolymer rubber has a Mooney viscosity ($ML_{1+4}$, 100° C.) ranging from 50 to 100. The Mooney viscosity was measured according to ASTM-D927. Examples of the olefine copolymer rubber are amorphous and random elastic copolymers mainly composed of olefins such as ethylene-propylene copolymer rubber, ethylene-1-butene copolymer rubber, ethylene-propylene-nonconjugated diene terpolymer rubber, enthylene-butene-nonconjugated diene terpolymer rubber, and propylene-butadiene copolymer rubber. Of these, ethylene-propylene-nonconjugated diene terpolymer rubber is preferable. Examples of nonconjugated diene are dicyclopentadiene, 1,4-hexadiene, cyclooctadiene, methylene norbornene, ethylidene norbornene, and the like. Of these, dicyclopentadiene and ethylidene norbornene are particularly preferable.

More concrete examples of the olefin copolymer rubber are ethylene-propylene-dicyclopentadiene copolymer rubber (refereed hereinafter to "EPDM") and ethylidene norbornene copolymer rubber. If the Mooney viscosity (index) of the olefin copolymer rubber is lower than 50, a strength particularly an impact strength at a low temperature is insufficient. If the Mooney viscosity exceeds 100, fabrication and processing characteristics particularly a flowability of the material is deteriorated.

Examples of the polyolefin resin used in the present invention are polypropylene and copolymers of propylene and α-olefin having two or more carbons. Examples of the α-olefin having two or more carbons are ethylene, 1-butene, 1-pentene, 3-methyl-1-butene, 1-hexene, 1-decene, 3-methyl-1-pentene, 4-methyl-1-pentene, 1-octane, and the like.

These polymers of the polyolefin resin has a Melt Flow Rate ranging from 0.1 to 100 g/10 min. and preferably ranging from 0.5 to 50 g/10 min. If the Melt Flow Rate is lower than 0.1 g/10 min. or higher than 100 g/10 min., problems will arise in a processing characteristics. The Melt Flow Rate is a flow rate (g/10 min.) of a resin (kept at 230° C.) flowing through a hole (diameter: 2.0955 mm, axial length: 8 mm) formed in a die under a load of 2.16 kg. This Melt Flow Rate is according to JIS (Japanese Industrial Standard)-K 7210.

This polyolefin resin is mixed or blended in an amount ranging from 10 to 50 parts by weight with 100 parts by weight of the above-mentioned olefin copolymer rubber. If the blended amount is smaller than 10 part by weight, the flowability of the material is lowered. If the blended amount exceeds 50 parts by weight, the rigidity of the material is high and therefore an impact strength of the material at a low temperature is lowered.

The mixture including the above-mentioned olefine copolymer rubber and the polyolefin resin is subjected to a dynamic heat-treatment so that the components of the mixture are partially cross-linked, thereby obtaining the thermoplastic elastomer composition. The dynamic heat-treatment will be discussed hereinafter.

The olefin copolymer rubber, the polyolefine resin, the organic peroxide and a cross-linking coagent if necessary are mixed with each other and then are dynamically heat-treated. In other words, these components are molten and kneaded. A conventional and known closed type Banbury mixer, twin screw kneader or the like is used as a kneading apparatus for kneading the components. It is preferable that the kneading is carried out at a temperature ranging from 150° C. to 300° C. and for a time ranging from about 1 to 30 minutes. In production of this thermoplastic elastomer composition, auxiliary materials such as an inorganic filler (s), an antioxidant(s), a weathering agent(s), an antistatic agent(s), and a coloring pigment(s) may be mixed with the main components.

Examples of the organic peroxide for partially cross-linking the components of the mixture including the olefin copolymer rubber and the polyolefine resin are 2, 5-dimethyl-2, 5-di(t-butylperoxy) hexane, 2,5-dimethyl-2, 5-di(t-butylperoxy) hexyne-3, 1, 3-bis (tbutylperoxyisopropyl) benzene, 1, 1-di(t-butylperoxy) 3, 5, 5-trimethylcyclohexane, 2, 5-dimethyl-2, 5-di (peroxybenzoyl) hexyne-3, dicumyl peroxide, and the like. Of these, 2, 5-dimethyl-2, 5-di(t-butylperoxy) hexane is preferable particularly from the view points of odor characteristics and scorching characteristics.

The added amount of the organic peroxide is selected preferably within a range of from 0.005 to 2.0 parts by weight, more preferably within a range of from 0.01 to 0.6, relative to 100 parts by weight of total of the olefin copolymer rubber and the polyolefin resin. If the added amount is less than 0.005 part by weight, the effect of cross-linking reaction is low. If the added amount exceeds 2.0 parts by weight, controlling the reaction is difficult and besides providing economical disadvantages.

In production of the thermoplastic copolymer composition of the present invention, a peroxide cross-linking coagent or a polyfunctional vinyl monomer may be mixed as the cross-linking aids to promote the formation of the partial cross-linking or bridge structure under the action of the organic peroxide. Examples of the peroxide cross-linking coagent are N, N'-m-phenylene bismaleimide, toluylene bismaleimide, P-quinone dioxime, nitrobenzene, diphenyl guanidine, trimethylol propane, and the like. Examples of the polyfunctional vinyl monomer are divinylbenzene, ethylene glycol dimethacrylate, polyethylene glycol dimethacrylate, trimethylol propane trimethacrylate, allyl metacrylate, and the like.

Next, the mineral oil is added to the mixture which has been heat-treated as discussed above.

The mineral oil softener is a high boiling point petroleum fraction which is mixed for the purpose of improving a processing characteristics and a mechanical properties mainly to get softer characteristics. Examples of the mineral oil are of paraffin, naphthene and aromatic, in which the paraffinic oil is preferably used. If the amount of aromatic component is large, a staining occurs much and this restricts the uses for obtaining transparent or light-colored products, while light stability and heat resistance of the product or casing is lowered.

The mineral oil is added in an amount ranging from 5 to 50 parts by weight relative to 100 parts by weight of the mixture (including the olefin copolymer rubber and the polyolefin resin) which has been dynamically heat-treated.

If the added amount of the mineral oil is less than 5 parts by weight, the flowability of the material in an injection molding is lowered. If the added amount is more than 50 parts by weight, the mineral oil will bleed out at the surface of a molded product during a heat-resistance test for the molded product, thereby degrading the external appearance of the molded product.

Addition of the mineral oil is may be made in the same apparatus used for the dynamic heat-treatment under the action of the organic peroxide, or a separate apparatus, successively to the dynamic heat-treatment.

Examples of the apparatus to be used in addition of the mineral oil are a Banbury mixer, a twin screw kneader and the like, as same as the apparatus used in the dynamic heat-treatment.

To 100 parts by weight of the thermoplastic elastomer composition, 20 to 50 parts by weight of the random copolymer resin including propylene and at least one kind of 1-olefin other than propylene and 1 to 5 parts by weight of the modified polypropylene oligomer are further added or blended.

Examples of the 1-olefin are ethylene, 1-butene, 1-pentene, 3-methyl-1-butene, 1-hexene, 1-decene, 3-methyl-1-pentene, 4-methyl-1-pentene, 1-octene, and the like.

The content of the 1-olefin in the random copolymer is not less than 1% by weight. If the content is less than 1% by weight, the product is insufficient in softness or flexibility. Additionally, the random copolymer has a Melt Flow Rate ranging from 30 to 100 g/10 min. If the Melt Flow Rate is lower than 30, the flowability of the material during injection molding is degraded. If the Melt Flow Rate is higher than 100, the mechanical properties of the product is degraded.

As this random copolymer resin, one produced by a known method can be used. The random copolymer resin may be obtained directly under copolymerization or otherwise obtained by decomposing a resin having a low Melt Flow Rate in the presence of organic peroxide or the like. If the blended amount of this random copolymer resin is less than 20 parts by weight, the processing characteristics of the material is insufficient. If the blended amount exceeds 50 parts by weight, the impact strength of the product at a low temperature is lowered.

The above-mentioned modified propylene oligomer must contain hydroxyl group. The polypropylene oligomer having no hydroxyl group is inferior in adhesion characteristics of a coated film to the product thus causing the coated film to be peeled off. Even in case that polypropylene oligomer contains, for example, carboxyl group, epoxy group, or amino group, the adhesion characteristics of the coated film to the product is insufficient, in which peeling-off of the coated film will arise at a high temperature even if an initial adhesion of the coated film is sufficient.

The modified polypropylene oligomer containing hydroxyl group, used in the material of the present invention is prepared by introducing hydroxyl group into polypropylene oligomer. The modified polypropylene oligomer suitable for use has a number average molecular weight ranging from about 2000 to 15000 and a hydroxyl value ranging about 10 to 50. Such a modified polypropylene oligomer is available on the market under the trade name "Umex 1201H" of Sanyo Chemical Industries, Ltd. By blending the modified polypropylene oligomer containing hydroxyl group, the material of the airbag storing casing of the present invention is improved in a point that slippage hardly occurs between the surface of the product (casing) and a coated film formed on the product surface by using a specified paint discussed after even under a wide thermal cycle ranging from a high temperature to a low temperature of the inside of a vehicle. The slippage depends on expansion and contraction of the material. Accordingly, the airbag storing casing of the present invention does not produce microcracks due to the slippage depending upon the expansion and contraction of the material, and therefore the product is high in safety and reliability. If the blended amount of this modified polypropylene oligomer is less than 1 part by weight, the above-mentioned sufficient adhesion characteristics of the coated film cannot be obtained. If the blended amount exceeds 5 parts by weight, the adhesion characteristics is improved; however, bleed will occur at a high temperature thereby increasing production cost.

The material or resin composition comprising the above-mentioned components is high in so-called toughness and excellent in weather resistance, and has a characteristics that a variety of physical properties including the above properties substantially do not deteriorate throughout a wide temperature range from high to low temperatures. Accordingly, the airbag storing casing of the present invention formed by fabricating this composition can allow the airbag storing casing to tear only along predetermined tearing lines to develop so as to cause an airbag to smoothly inflate in a direction predetermined according to a design when the airbag is operated, although the airbag storing casing is of the single layer structure. Thus, the most basic required performance for an airbag storing casing can be satisfied by the airbag storing casing formed of the material.

Table 1 qualitatively shows evaluation of physical properties important as the material of the airbag storing casing on the material of the present invention and a variety of materials for an airbag storing casing Table 1 reveals that the material of the present invention is very suitable for the airbag storing casing.

TABLE 1

| MATERIAL PHYSICAL PROPERTY | DECISION STANDARD | MATERIAL | | | | | | |
|---|---|---|---|---|---|---|---|---|
| | | POLYPRO-PYLENE (PP) | ACRYLO-NITRILE BUTADIENE (ABS) | VINYL CHLORIDE ELASTOMER (TPVC) | POLYESTER ELASTOMER (TPEE) | OLEFINE ELASTOMER (TPO) | ETHYLENE ELASTOMER (TPS) | POLY-URETHANE ELASTOMER (TPU) |
| PAINTING CHARACTERISTICS | NO ABNORMALITY | B | A | A | A | A | A | A |
| BLEED | NONE | A | A | B | A | A | B | A |
| HARDNESS | NOT HIGHER THAN 90 (SHORE A) | C | B | B | A | A | A | B |
| SPECIFIC GRAVITY | NOT HIGHER THAN 1.1 | A | B | C | B | A | A | B |
| BRITTLE TEMPERATURE | NOT LOWER THAN −60° C. | A | A | A | A | A | A | A |
| GLASS TRANSITION POINT | NOT LOWER THAN −60° C. | A | A | A | A | A | A | A |
| THERMAL DEFORMATION TEMPERATURE | NOT LOWER THAN 110° C. | A | B | B | A | A | C | A |
| FLEXURAL ELASTIC MODULUS | NOT HIGHER THAN 1500 kg/cm$^2$ | A | C | A | A | A | A | A |
| PERCENTAGE ELONGATION AFTER FRACTURE | NOT HIGHER THAN 500% | C | A | A | C | A | A | A |
| TENSILE STRENGTH | NOT HIGHER THAN 60 Kg | C | C | C | C | A | A | A |

NOTE:
*EVALUATION
A: EXCELLENT
B: GOOD
C: BAD

To the above-mentioned material or resin composition of the present invention, antioxidant, ultraviolet ray absorbing agent, light stabilizing agent, antistatic agent, lubricant, dye, pigment, plasticizer, flame retarder, softener and/or the like may be added if necessary.

The fabrication method of the airbag storing casing of the above-mentioned single layer structure is not particularly limited, and therefore usual or general fabrication methods can be used for the airbag storing casing, in which injection molding is particularly preferable.

Next, a paint to be coated on the surface of the airbag storing casing will be discussed.

The paint to be used for the airbag storing cover of the present invention contain at least chlorinated polyolefine resin and polycaprolactone polyol resin as resin components. It is preferable that the chlorinated polyolefine resin is in an amount ranging from 30 to 60% by weight relative to the total resin components, and polycaprolactone polyol resin is in an amount ranging from 15 to 40% by weight relative to the total resin components. The paint to be used for the airbag storing cover of the present invention may contain other resin components. Examples of these resin components are acrylpolyol resin and alkyd resin, in which acrylpolyol resin is preferable. A hardener of the paint to be used for the airbag storing casing of the present invention is a mixture of a first addition compound of hexamethylene diisocyanate, isophorone diisocyanate and polyol, and a second addition compound of hexamethylene diisocyanate and polyester polyol. It is preferable to use the former or first addition compound in an amount ranging from 45 to 60% by weight relative to the mixture of the first and second addition compound, and the latter or second addition compound in an amount ranging from 40 to 55% by weight relative to the mixture. Additionally, the paint to be used for the airbag storing casing of the present invention contains alcohol-modified silicone in an amount ranging from 3 to 12% by weight as a modifier, relative to a resin component.

By virtue of the fact that the paint contains the above-mentioned components, the paint can be effectively bonded or adhered to the surface of the molded product of the airbag storing casing and can form a rigid coated film on the surface of the casing under drying at a temperature ranging from 60° to 80° C. and for a time ranging from 30 to 40 minutes by using a so-called one-coat and one-bake manner. The thus obtained airbag storing casing of the present invention can meets its required performance throughout a wide temperature range of low to high temperatures within a compartment of a vehicle actually equipped with the casing. In other words, the coated film of the paint can maintain a sufficient bond strength to the main body of the casing even under a wide thermal cycle from low to high temperatures inside the vehicle, without production of micro-cracks. Additionally, the paint coated film is sufficient in impact strength, moisture resistance and heat resistance, providing an excellent external appearance to the airbag storing casing.

Hereinafter, the present invention will be discussed further in detail with reference to Examples.

Fabrication of Airbag Storing Casing

EXAMPLE 1

Melting and mixing were made in a Banbury mixer for 12 minutes to dynamically heat-treat a mixture of 100 parts by weight of ethylene-propylene-dicyclopentadiene terpolymer rubber having a Mooney viscosity ($ML_{1+4}$, 100° C.) of 85 and a propylene content of 50% by weight and a dicyclopentadiene content of 4% by weight, 25 parts by weight of homogenized polypropylene having a Melt Flow Rate of 10 g/10 min. and 0.32 part by weight of 2, 5-dimethyl-2, 5-di(tertiary butyl peroxide) hexane. Thereafter, 37.5 parts by weight of paraffinic process oil (the trade name "Diana Process Oil PW380" produced by Idemitu Kosan Co., Ltd.) was added to the dynamically treated mixture and mixed for 5 minutes. Then, the mixture was subjected to pelletization by using a monoaxial pelletizing apparatus thereby obtaining pellet-like thermoplastic elastomers. The temperature of the mixture or material at the time of finishing the dynamic heat-treatment was about 180° C.

Next, melting and mixing were made at 180° C. for a mixture of 100 parts by weight of the above-mentioned thermoplastic elastomer, 38.6 parts by weight of propylene-ethylene random copolymer having a Melt Flow Rate of 60 g/10 min. and an ethylene content of 3.2% by weight, and 4.3 parts by weight of "Umex 1201H" produced by Sanyo Chemical Industries, Ltd., by using the Banbury mixer. Thus, raw material resin pellets to be used according to the present invention were obtained.

Figure 2:
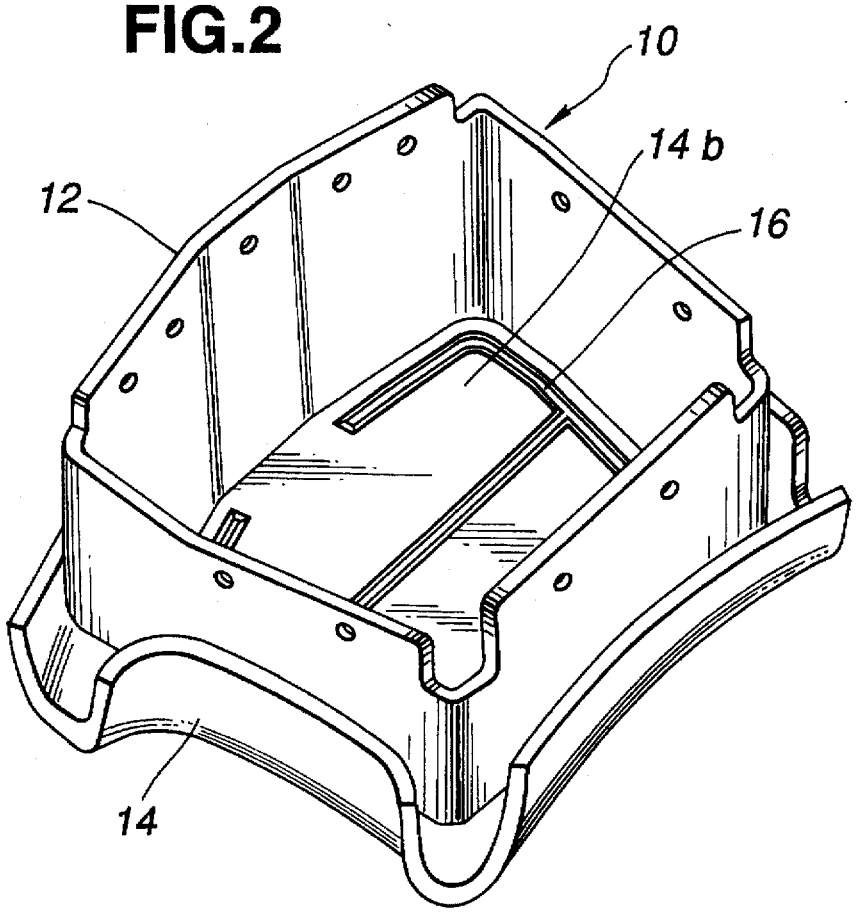
FIG. 2 is a perspective view of the airbag storing casing of FIG. 1 but as viewed from an under direction.
Figure 3:
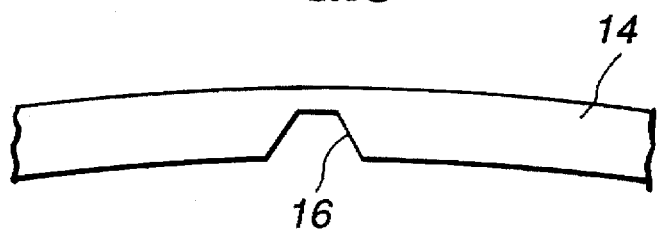
FIG. 3 is a fragmentary sectional view taken in the direction of arrows substantially along the line of III—III.

The raw material resin pellets obtained above were subjected to injection molding at a molding temperature of 180° to 220° C., at an injection pressure of 50 to 100 MPa, at a metallic die temperature of 20° to 50° C., for a cooling time of 30 to 50 sec., and for an injection time of 7 to 12 sec. thereby forming an airbag storing casing as shown in FIGS. 1 to 3. The airbag storing casing 10 is generally cup-shaped and usually installed to a base member (not shown) within a passenger compartment of an automotive vehicle, in the state of FIG. 1. More specifically, the airbag storing casing 10 comprises a tube-like section 12 having a generally rectangular cross-section. The tube-like section 12 is fixedly attached to the base member of a vehicle body. A top lid-like section 14 is integral with the tube-like section 12 and has a top flat surface 14a which faces a vehicle occupant (not shown). It will be understood that an inflatable airbag (not shown) is stored in its folded state inside the airbag storing casing 10. As shown in FIG. 2, the lid-like section 14 is formed at its inner surface 14b with grooves 16 to form thin wall portions in the lid-like section 14. It will be appreciated that the airbag storing casing 10 tears along the grooves 16 to allow the airbag projects toward the vehicle occupant when the airbag is inflated under operation of an airbag restraint system including the airbag storing casing 10.

Painting Airbag Storing Casing

EXAMPLE 2

A paint of EXAMPLE 2 was prepared in a method as set forth below. First, a main resinous ingredient was prepared by mixing the following components:

| [Resin components:] | |
|---|---|
| Chlorinated polyolefine resin (the trade name "Superchlon 224H" produced by Sanyo Kokusaku Palupu or Nippon Paper Ind.) | 13.5 wt % |
| Polycaprolactone polyol resin (the trade name "Placcel L208AL" produced Daicel Kagaku) | 8.0 wt % |
| Acrylpolyol resin (the trade name "Desmophen A-160" produced | 6.0 wt % |

-continued

| by Sumitomo Byer Urethane) [Solvent components:] | |
|---|---|
| toluene | 44.5 wt % |
| Ethyl acetate | 8.0 wt % |
| Xylene | 4.5 wt % |
| [Pigment:] | |
| Carbon black | 3.0 wt % |
| [Gloss adjusting agent:] | |
| Silica fine powder | 8.0 wt % |
| [Modifier:] | |
| Alcohol-modified silicone (the trade name "SF8428" produced by Toray Dow Corning silicone) [Stabilizer:] | 2.5 wt % |
| Epoxy resin [Light resisting agent:] | 1.0 wt % |
| Hindered amine | 1.0 wt % |

To 100 parts by weight of the main resinous ingredient consisting of the above components, 18 parts by weight of a hardener was added. The hardener consisted of 50% by weight of an addition polymer the trade name "Z4370" produced by Sumitomo Byer Urethane) of hexamethylene diisocyanate, isophorone diisocyanate and polyol and 45% by weight of addition product (the trade name "E405-90T" produced by Asahi chemical) of hexamethylene diisocyanate and polyester polyol, and 5% by weight of toluene. Furthermore, 60 parts by weight of a mixture consisting 60% by weight of methyl ethyl ketone, 15% by weight of toluene and 25% by weight of butyl acetate was added as a diluent. Thus, the paint to be used for the airbag storing casing was prepared.

Figure 4:
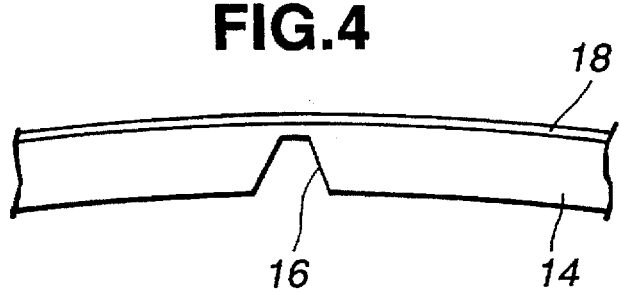
FIG. 4 is a fragmentary sectional view similar to FIG. 3 but showing a state in which a paint is coated on the surface of the airbag storing casing.

This paint was coated on the surface of the airbag storing casing which had been fabricated as mentioned above. Then, the paint was dried at 80° C. for 30 minutes thereby to form a coated film 18 having a thickness of 25µ in a dried state, as shown in FIG. 4. The performance of this coated film was evaluated to provide a result which is shown in Table 2.

COMPARATIVE EXAMPLE 1

A paint was prepared according to a method as set forth below, in which polycaprolactone polyol resin as the resin component and the modifier were not used, in which the hardener was different from that in EXAMPLE 1. First, a main resinous ingredient was prepared by mixing the following components:

| [Resin components:] | |
|---|---|
| Chlorinated polyolefine resin (the trade name "Superchlon 822" produced by Sanyo Kokusaku Palupu or Nippon Paper Ind.) | 15.0 wt % |
| Acrylpolyol resin (the trade name "Desmophen A365" produced by Sumitomo Byer Urethane) [Solvent components:] | 10.0 wt % |
| toluene | 45.0 wt % |
| Ethyl acetate | 5.0 wt % |
| Xylene | 4.0 wt % |
| Butyl acetate | 8.0 wt % |

| [Pigment:] | |
|---|---|
| Carbon black | 3.0 wt % |
| [Gloss adjusting agent:] | |
| Silica fine powder | 8.0 wt % |
| [Stabilizer:] | |
| Epoxy resin | 1.0 wt % |
| [Light resisting agent:] | |
| Benzotriazole | 1.0 wt % |

To 100 parts by weight of the main resinous ingredient consisting of the above components, 15 parts by weight of a hardener was added. The hardener consisted of 60% by weight of hexamethylene diisocyanate (the trade name "Desmodur N-75" produced by Sumitomo Chemical Co., Ltd.), 20% by weight of toluene, and 20 parts by weight of cellosolve acetate. Furthermore, 60 parts by weight of a diluent consisting 30% by weight of methyl ethyl ketone, 25% by weight of toluene, 30% by weight of xylene and 15% by weight of butyl acetate was added. Thus, the paint of COMPARATIVE EXAMPLE 1 was obtained. By using this paint, the airbag storing casing was painted in the same as that in EXAMPLE 1. The performance of a coated film formed was evaluated to obtain a result which is shown in Table 2.

COMPARATIVE EXAMPLE 2

A paint was prepared according to a method as set forth below, in which the modifier was not used, in which the hardener was different in kind from that in EXAMPLE 1. First, a main resinous ingredient was prepared by mixing the following components:

| [Resin components:] | |
|---|---|
| Chlorinated polyolefine resin | 15.0 wt % |
| (the trade name "Superchlon 822" produced by Sanyo Kokusaku Palupu or Nippon Paper Ind.) | |
| Polycaprolactone polyol resin | 10.0 wt % |
| (the trade name "Placcel L220AL" produced by Daisel Chemical Industries Ltd.) | |
| [Solvent components:] | |
| toluene | 45.0 wt % |
| Ethyl acetate | 5.0 wt % |
| Xylene | 4.0 wt % |
| Butyl acetate | 8.0 wt % |
| [Pigment:] | |
| Carbon black | 3.0 wt % |
| [Gloss adjusting agent:] | |
| Silica fine powder | 8.0 wt % |
| [Stabilizer:] | |
| Epoxy resin | 1.0 wt % |
| [Light resisting agent:] | |
| Benzotriazole | 1.0 wt % |

To 100 parts by weight of the main resinous ingredient consisting of the above components, 15 parts by weight of a hardener was .added. The hardener consisted of 50% by weight of a mixture of hexamethylene diisocyanate (the trade name "Desmodur N-75" produced by Sumitomo Chemical Co., Ltd.) and an addition product (the trade name "E402-90T" produced by Asahi Chemical) of hexamethylene diisocyanate and polyester polyol, 25% by weight of toluene, and 25% by weight of ethyl acetate. Furthermore, 60 parts by weight of a diluent consisting of 30% by weight of methyl ethyl ketone, 30% by weight of toluene, 25% by weight of xylene and 15% by weight of butyl acetate was mixed. Thus, the paint of COMPARATIVE EXAMPLE 2 was obtained. By using this paint, the airbag storing casing was painted in the same as that in EXAMPLE 1. The performance of a coated film formed was evaluated to obtain a result which is shown in Table 2.

COMPARATIVE EXAMPLE 3

A paint of COMPARATIVE EXAMPLE 3 was prepared according to a method as set forth below, in which s modifier was not used, in which the hardener was different in kind from that in EXAMPLE 1. First, a main resinous ingredient was prepared by mixing the following components:

| [Resin components:] | |
|---|---|
| Chlorinated polyolefine resin | 15.0 wt % |
| (the trade name "Superchlon 822" produced by Sanyo Kokusaku Palupu or Nippon Paper Ind.) | |
| Polycaprolactone polyol resin | 7.5 wt % |
| (the trade name "Placcel L220AL" produced by Daisel Chemical Industries Ltd.) | |
| Cellulose acetate butyrate resin | 2.5 wt % |
| (the trade name "CAB551-0.2" produced by Eastman Chemical) | |
| [Solvent components:] | |
| toluene | 40.0 wt % |
| Ethyl acetate | 5.0 wt % |
| Xylene | 10.0 wt % |
| Butyl acetate | 7.0 wt % |
| [Pigment:] | |
| Carbon black | 3.0 wt % |
| [Gloss adjusting agent:] | |
| Silica fine powder | 8.0 wt % |
| [Stabilizer:] | |
| Epoxy resin | 1.0 wt % |
| [Light resisting agent:] | |
| Benzotriazole | 1.0 wt % |

To 100 parts by weight of the main resinous ingredient consisting of the above components, 15 parts by weight of a hardener was added. The hardener consisted of 60% by weight of hexamethylene diisocyanate (the trade name "Desmodur N-75" produced by Sumitomo Chemical Co., Ltd.), 20% by weight of toluene, and 20% by weight of cellosolve acetate. Furthermore, 60 parts by weight of a diluent consisting of 30% by weight of methyl ethyl ketone, 30% by weight of toluene, 25% by weight of xylene and 15% by weight of butyl acetate was mixed. Thus, the paint of COMPARATIVE EXAMPLE 3 was obtained. By using this paint, the airbag storing casing was painted in the same manner as that in EXAMPLE 1. The performance of a coated film formed was evaluated to obtain a result which is shown in Table 2.

TABLE 2

| | Example 2 | Comparative Example 1 | Comparative Example 2 | Comparative Example 3 |
|---|---|---|---|---|
| External appearance | Good | Good | Good | Good |
| Adherence | Good | Bad | Bad | Bad |

TABLE 2-continued

|  | Example 2 | Comparative Example 1 | Comparative Example 2 | Comparative Example 3 |
|---|---|---|---|---|
| characteristics |  |  |  |  |
| Impact  Ord. temp. | Good | Bad | Bad | Bad |
| resis-  −20° C. | Good | Bad | Bad | Bad |
| tance  −30° C. | Good | Bad | Bad | Bad |
| Moisture resistance (40° C., 99%, 120 hrs) | Good | Bad | Bad | Bad |
| Heat resistance (110° C., 300 hrs) | Good | Good | Good | Good |

The evaluation of the performance of the coated film of the paints of EXAMPLE 2 and COMPARATIVE EXAMPLES 1 to 3 was made under the following standards:

External appearance:

"Good": None of nonuniformity, lack of hiding, orange peel, drop, cracking and streak was recognized under visual observation.

"Bad": Any of nonuniformity, lack of hiding, orange peel, drop, cracking and streak was recognized under the same observation.

Adherence characteristics:

"Good": No peeling was recognized under a so-called cross-cut test.

"Bad": Any peeling was recognized under the same test.

The cross-cut test was carried out as follows: A plurality of straight liner cuts were parallely made on the surface of the coated film with a distance of 2 mm between the adjacent lines. Then, a plurality of straight linear cuts were parallely made on the surface of the coated film in a manner to cross the former straight linear cuts thereby to form a plurality of square cut pieces. All the straight linear cuts reached the surface of the airbag storing casing. An adhesive tape was applied on the surface of 25 square cut pieces. Then, the adhesive tape was peeled off from the surface of the paint film at a stretch, and the peeled-off condition of 25 square cut pieces of the coated film was observed to evaluate the adherence characteristics of the coated film. If all 25 square cut pieces remained not peeled off, the evaluation was "Good". If any of 25 square cut pieces was peeled off, the evaluation was "Bad".

Impact resistance:

"Good": No peeling was recognized under a test of Du Pont Impact Tester at ordinary temperature, −20° C. and −30° C.

"Bad": Any peeling and/or any cracking was recognized under the same test.

The test of Du Pont Impact Tester is according to JIS (Japanese Industrial Standard) K-5400 and was made by dropping a weight of 500 g onto an impact member in contact with the surface of the paint coated film from a height of 50 cm, in which a tip end of the impact member had a diameter of 12.7 mm.

Moisture resistance:

"Good": None of blistering, chalking and peeling was recognized after the paint film was allowed to stand at 40° C. for 120 hours in the atmosphere of a humidity of 99%.

"Bad": Any of blistering, chalking and peeling was recognized under the same condition.

Heat resistance:

"Good": None of color-change, blistering, peeling and remarkable gloss-change was recognized after the paint coated film was allowed to stand at 110° C. for 300 hours.

"Bad": Any of color-change, blistering, peeling and remarkable gloss-change was recognized under the same condition.

What is claimed is:

1. A combination of an airbag storing casing with a paint coated on a surface of said casing, said casing being for storing an airbag for an airbag restraint, said casing being formed of a material comprising:

(a) a thermoplastic elastomer composition in an amount of 100 parts by weight, said thermoplastic elastomer composition being prepared by a process including mixing 10 to parts by weight of a polyolefin resin with 100 parts by weight of an olefin copolymer rubber to obtain a mixture, dynamically heat-treating said mixture in the presence of an organic peroxide, and then adding 5 to 50 parts by weight of a mineral oil relative to 100 parts by weight of the dynamically heat-treated mixture, said olefin copolymer rubber having a Mooney viscosity ($ML_{1+4}$, 100° C.) ranging from 50 to 100;

(b) a random copolymer resin in an amount of 20 to 50 parts by weight, containing propylene and at least one kind of 1-olefin other than propylene and having a Melt Flow Rate ranging from 30 to 100 g/10 min at a temperature of 230° C. under a load of 2.16 kg; and (c) a modified polypropylene oligomer containing hydroxyl group, in an amount ranging from 1 to 5 parts by weight, wherein said paint comprises: a resin component including chlorinated polyolefin resin, and polycaprolactone polyol resin; a modifier including alcohol-modified silicone; and a hardener including a mixture of an addition product of hexamethylene diisocyanate, isophorone diisocyanate and polyol and an addition product of hexamethylene diisocyanate and polyester polyol.

2. A combination as claimed in claim 1, wherein the chlorinated polyolefin resin is present in an amount of 30 to 60% by weight relative to the total resin components and the polycaprolactone polyol resin is present in an amount ranging from 15 to 40% relative to the total resin components.

3. A combination of an airbag storing casing with a paint coated on a surface of said casing, said casing being for storing an airbag for an airbag restraint, said casing being formed of a material comprising:

(a) a thermoplastic elastomer composition in an amount of 100 parts by weight, said thermoplastic elastomer composition being prepared by a process including mixing 10 to 50 parts by weight of a polyolefin resin with 100 parts by weight of an olefin copolymer rubber to obtain a mixture, dynamically heat-treating said mixture in the presence of an organic peroxide, and then adding 5 to 50 parts by weight of a mineral oil relative to 100 parts by weight of the dynamically heat-treated mixture, said olefin copolymer rubber having a Mooney viscosity ($ML_{1+4}$, 100° C.) ranging from 50 to 100;

(b) a random copolymer resin in an amount of 20 to 50 parts by weight, containing propylene and at least one kind of 1-olefine other than propylene and having a Melt Flow Rate ranging from 30 to 100 g/10 min at a temperature of 230° C. under a load of 2.16 kg; and (c) a modified polypropylene oligomer containing hydroxyl group, in an amount ranging from 1 to 5 parts by weight, wherein said paint comprises: a resin component including chlorinated polyolefin resin, and polycaprolactone polyol resin; a modifier including alcohol-modified silicone; and a hardener including a mixture of an addition product of hexamethylene diisocyanate, isophorone diisocyanate and polyol and an addition product of hexamethylene diisocyanate and polyester polyol, and wherein said paint is coated on the surface of said casing by one-coat and one-bake manner.

4. A combination as claimed in claim 1, wherein the casing has a single layer structure.

5. A combination as claimed in claim 1, wherein the casing consists essentially of the recited components.

6. A combination as claimed in claim 1, wherein the modified polypropylene oligomer containing hydroxyl group has a number average molecular weight of about 2,000 to 15,000.

7. A combination as claimed in claim 1, wherein the polyolefin resin of (a) has a melt flow rate of from 0.1 to 100 g/10 min. at a temperature of 230° C. under a load of 2.16 kg and comprises polypropylene or a copolymer of propylene and an α-olefin.

8. A combination as claimed in claim 1, wherein the casing has linearly extending wall parts along which the casing is tearable upon inflation of the airbag.

9. A combination as claimed in claim 1, wherein the material is fabricated by injection molding.

10. An airbag restraint system comprising an airbag arranged in a combination as claimed in claim 1.

11. A combination as claimed in claim 1, wherein the olefin copolymer rubber of (a) comprises an ethylene-propylene-nonconjugated diene terpolymer rubber.

12. A combination as claimed in claim 1, wherein the dynamic heat-treatment is carried out for 1 to 30 minutes at a temperature from 150° to 300° C.

13. A combination as claimed in claim 1, wherein 0.005 to 2.0 parts by weight of the organic peroxide relative to 100 parts by weight of the total of the olefin copolymer rubber and the polyolefin resin are used in (a).

14. A combination as claimed in claim 1, wherein the dynamic heat-treatment takes place in the presence of a crosslinking coagent or a polyfunctional vinyl monomer.

15. A combination as claimed in claim 1, wherein the modified polypropylene oligomer has a hydroxyl number from about 10 to 50.

16. A vehicle containing an airbag restraint system as claimed in claim 10.

17. A combination as claimed in claim 1, wherein the paint comprises an acrylpolyol resin.

18. A combination as claimed in claim 1, wherein the paint comprises an alkyd resin.

19. A combination as claimed in claim 1, wherein the paint comprises 3 to 12% by weight of the alcohol-modified silicone based on the weight of the resin component.

20. A combination as claimed in claim 3, wherein the one-coat, one-bake manner comprises drying at a temperature ranging from 60° to 80° C. for a time ranging from 30 to 40 minutes.

* * * * *